May 23, 1944. H. G. TATOSIAN 2,349,583
APPARATUS FOR MAKING MELBA TOAST
Filed Jan. 17, 1942
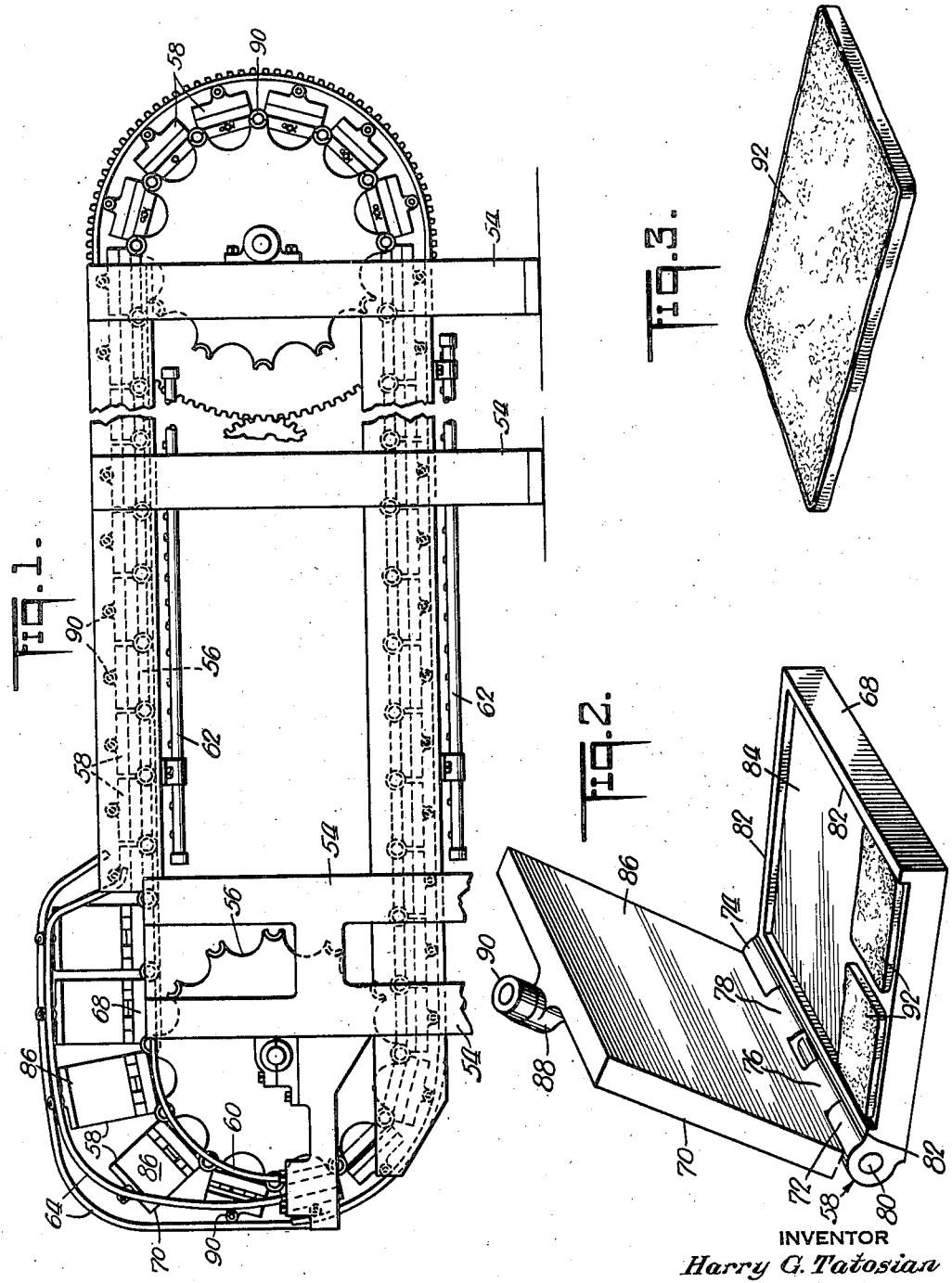
INVENTOR
Harry G. Tatosian
BY
ATTORNEY Patented May 23, 1944

2,349,583

UNITED STATES PATENT OFFICE 2,349,583

APPARATUS FOR MAKING MELBA TOAST

Harry G. Tatosian, New York, N. Y., assignor to King Kone Corporation, New York, N. Y., a corporation of New York Application January 17, 1942, Serial No. 427,164

1 Claim. (Cl. 99—373)

The present invention relates generally to toasted bread products, and it is directed specifically to apparatus for making toast of the type conventionally known as melba toast.

At the present time it is the customary practice to make melba toast from conventionally sliced bread which is sold by large baking establishments to retail stores for sale to the home consumer. Of this kind of bread there is a substantial percentage sold and delivered to the storekeepers which remains unsold from day to day. It is the regular practice of such bakers to take back from day to day their unsold day-old bread, which obviously must be disposed of through other channels of trade as it cannot be resold again as fresh bread. This returned day-old bread results in a very substantial loss to such bakers. It is now a practice among such bakers to take their returned day-old bread, cut the slices in half, trim off the crust portions, and make melba toast out of it. Trimming off the crust in this process has many distinct disadvantages. It is wasteful. The crust is the most healthful part of a piece of bread, and it is the part most highly desired by many people. In the manufacture of such melba toast, it is also deemed necessary and essential to toast such prepared bread slices under pressure to reduce its thickness and close up its porosity so as to make it tasty and saleable to the trade.

With the apparatus hereinafter to be described, however, it has been found that a better and more tasty product can be produced, obviating the inherent disadvantages of the above practice, by baking a specially prepared bread loaf of a size suitable for producing a melba toast slice of the size desired, which bread loaf is provided with an encircling crust on all exterior surfaces that gives the finished toasted product an eye and taste appeal not found in the conventional types of melba toast made according to the practice hereinbefore described.

An object of the present invention is to provide a novel apparatus whereby thin slices of bread may be toasted in a continuous manner first on one side and then the other side to make melba toast without pressure whereby the toasted bread slices will have a slightly roughened surface that imparts a more natural and tasty feeling on the tongue of the consumer than the glazed surfaces of similar toast made under pressure.

Another object of the invention is the provision of apparatus having specially constructed book molds whereby such bread slices may be toasted without pressure, first on one side and then the other side, and subsequently discharged from their respective molds by gravity through an opening in the side thereof.

Various other objects and advantages of the invention, which result in simplicity, economy and efficiency, will be apparent from the following detailed description, wherein a preferred form of practicing the invention is described, reference being had to the accompanying drawing, forming a part hereof, wherein like numerals indicate like parts, in which:

Fig. 1 is a front elevational view of a cake baking machine, having an endless series of hinged book molds adapted to be moved continuously over a circular path into and out of heating ovens, for toasting the bread slices;

Fig. 2 is a perspective view of one of the hinged book molds of the baking machine shown in Fig. 1, which is illustrated in its open position, showing the manner in which the bread slices are positioned therein; and Fig. 3 is a perspective view of the slice of bread after it has been removed from the mold shown in Fig. 2.

After the bread loaf 32 has been cut into a plurality of individual slices 50, they are ready to be toasted. While the toasting may be accomplished in many different ways, and on many different types of machines, a very satisfactory machine is shown in Fig. 1, consisting of a supporting frame structure 54 having an intermittently moving conveying mechanism 56 for operating an endless series of hinged individual book molds 58 along a circular track 60 having upper and lower sections. Heating means in the former of gas or oil burners 62 are provided adjacent each section for heating the molds 58. As the molds 58 are moved from the lower section of the track 60 to the upper section they are adapted to be opened automatically for the purpose of permitting removal of the toasted bread slices and refilling of the emptied molds with fresh bread slices to be toasted. For this purpose cam rails 64 are provided for opening the hinged book molds 58. In my Letters Patent No. 1,540,041, there is shown and described in detail a complete machine of the type illustrated in Fig. 1, and, since the machine per se forms no part of this invention, it is believed that such reference is sufficient to enable anyone to construct and build such a machine without the necessity of repeating the description and structural details herein.

The hinged book molds 58, one of which is shown in perspective in Fig. 2, consists of upper and lower sections 68 and 70 having overlapping aligned apertured lugs 72 and 74 and 76 and 78 respectively, connected by a pintle shaft 80 so that the sections may be opened and closed in the manner of a book. The lower section 68 is provided with a shoulder 82 along three edges, namely, the back, front and one side, providing a recess 84 which is open along the other or fourth side for discharging gravitationally the toasted bread slices as the molds are being raised perpendicularly at the end of the toasting cycle. The upper section 70 has a flat bottom surface 86 which is adapted to rest on the shoulders 82 of the lower section when the mold is closed. The upper section 70 is also provided with an integral projection at its upper outer end, as indicated at 88, for providing means for supporting a roller member 90 adapted to cooperate with the cam rails 64 for opening and closing the mold as it passes around its circuitous path.

It will be noted that the recess 84 has a depth a trifle larger than the thickness of the bread slices 50 to be toasted therein so that such bread slices may be free of any pressure during the toasting operation. This is important because it permits the bread surface to remain free during the toasting operation, preventing a glazed surface to be formed thereon as in the case of bread toasted while under pressure. Toasted bread slices 92 made according to this method have a superior and more appetizing appearance over bread slices toasted under pressure. Furthermore, such toasted bread slices have a slightly roughened surface, which will facilitate spreading with butter, jam, jellies, etc. This roughened surface imparts a more natural and tasty feeling to the tongue of the consumer than melba toast slices made under pressure under present day practices.

Although I have only described in detail one form which the invention may assume, it will be apparent to those skilled in the art that various other modifications may be made therein without departing from the spirit of the invention or from the scope of the appended claim.

What I claim is:

Apparatus for making melba toast without pressure comprising an endless conveyor having a series of individual book molds each adapted to receive a plurality of slices of bread to be toasted, said molds having an upper and lower section, the upper section having a flat inner surface and an outwardly projecting roller member for engaging a cam track, the lower section having an upstanding flange of greater height than the thickness of the bread slices to be toasted extending around all but the rear side thereof for engaging and supporting the upper section in spaced relation to the toasting surface of the lower section thereby forming a pocket in the mold when the sections are closed for loosely receiving and holding a plurality of slices of bread to be toasted, upper and lower heating chambers, a loading station in front of the upper heating chamber having a cam track mounted in the path of the roller members of the molds for opening and closing the molds as they pass thereby, means for driving the conveyor to move the molds first through the upper heating chamber to cause one side of the bread slices to be toasted, for turning over said molds as they pass out of the upper heating chamber and into the lower heating chamber for toasting the opposite sides of the bread slices, and for turning over said molds as they pass upwardly from the lower heating chamber to the loading station so that the toasted bread slices may be discharged by gravity from the molds through the open rear sides thereof.

HARRY G. TATOSIAN.